(12) United States Patent
Fairweather

(10) Patent No.: US 7,555,755 B2
(45) Date of Patent: Jun. 30, 2009

(54) SYSTEM AND METHOD FOR NAVIGATING DATA

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 1193 days.

(21) Appl. No.: 10/357,284

(22) Filed: Feb. 3, 2003

(65) Prior Publication Data
US 2003/0188004 A1    Oct. 2, 2003

Related U.S. Application Data

(60) Provisional application No. 60/353,487, filed on Feb. 1, 2002.

(51) Int. Cl.
*G06F 3/00* (2006.01)
*G06F 9/44* (2006.01)
*G06F 9/46* (2006.01)
*G06F 13/00* (2006.01)

(52) U.S. Cl. .............. 719/320; 719/321; 718/100; 715/760

(58) Field of Classification Search ......... 719/310–320, 719/328–330, 321; 718/1, 100, 101; 715/700–770
See application file for complete search history.

(56) References Cited

U.S. PATENT DOCUMENTS

| | | | | |
|---|---|---|---|---|
| 5,951,653 A | * | 9/1999 | Hill et al. ............... | 719/315 |
| 6,138,170 A | * | 10/2000 | Matheson ................ | 719/318 |
| 6,670,969 B1 | * | 12/2003 | Halstead et al. ........... | 715/762 |
| 6,779,000 B1 | * | 8/2004 | Northrup ................ | 707/200 |
| 2002/0103824 A1 | * | 8/2002 | Koppolu et al. .......... | 707/501.1 |
| 2003/0179228 A1 | * | 9/2003 | Schreiber et al. .......... | 345/738 |
| 2006/0253785 A1 | * | 11/2006 | Dowling ................ | 715/738 |

OTHER PUBLICATIONS

Finkelstein et al, Real Time Threads Interface, University of British Columbia, 1995, pp. 1-22.*

* cited by examiner

*Primary Examiner*—Meng-Ai An
*Assistant Examiner*—Diem K Cao
(74) *Attorney, Agent, or Firm*—Stanley J. Gradisar

(57) ABSTRACT

The present invention provides a dynamic hyperlinking architecture that permits a user to enable/disable hyperlink domains that are automatically applied to every bit of textual data present in the system or displayed to the user. The present invention includes synchronous and asynchronous, inter-thread function calls, including support for function overrides in a threaded scope dependent manner. The present invention also supports broadcast (multiple call) call configurations and run-time examination of function registries. In the preferred embodiment, the system comprises a threaded environment, threaded type dependant symbolic functions and a hyperlinking system uses both the threaded environment and symbolic functions to dynamically create links to data and functions that are displayed and/or executed responsive to user selection of a link.

21 Claims, No Drawings

SYSTEM AND METHOD FOR NAVIGATING DATA

CROSS REFERENCE TO RELATED APPLICATION

This application claims the benefit of U.S. Provisional Application Serial No. 60/353,487 filed on Feb. 1, 2002 and titled "INTEGRATED MULTIMEDIA INTELLIGENCE ARCHITECTURE" which is incorporated herein by reference in its entirety for all that is taught and disclosed therein.

BACKGROUND OF THE INVENTION

A user interface is only as good as the focus that it provides. Digital information environments, such as the World Wide Web, are designed to capture and lead the focus of the person using them. This is often based on the agenda of the person creating the web page and most frequently that agenda is to garner advertising dollars. Thus, the problem of searching for the answer to something on the web only to be forced to focus on irrelevant web sites is a common experience. In such a scenario, a user often fails to find what they were looking for, often forgetting what they were looking for in the first place. This effect occurs because the digital domain is not constrained by the same relevance falloff law that constrains the analog world. Each navigation step may be arbitrarily large, and the human mind is poorly equipped to maintain focus, and thus the search for meaning or relevance in this environment is very difficult. Nowhere is this problem more inherent than in the use of hyperlinks.

In any large collection of disparate data, effective navigation becomes critical. For example, on the Internet the approach taken to navigation was to implement embedded "hyperlinks" which transition the user's focus to the URL referenced in the hyperlink. This works effectively, but is a manual, restrictive, and error prone business. The web-site designer must manually insert the chosen hyperlink to the URL, thereby enforcing his perspective on the user, rather than the perspective of the user. Worse yet, URLs change continuously and the referencing link then becomes out of date and useless. What is needed, then, is the ability to define and enable/disable hyperlink domains on a per-user basis based on the information and world-view that he, or the organization of which he is a member, brings to the problem the user is researching. In other words, in addition to conventional hyperlinks, which reveal the focus of others, what is needed is a user-centric, organization-centric, and domain-centric hyperlinks that are automatically applied to every bit of textual data present in the system or displayed to the user.

SUMMARY OF INVENTION

The present invention provides such a system. The present invention provides a dynamic hyper-linking architecture under the control of each user, not under the control of the information source. The present invention includes synchronous and asynchronous, inter-thread function calls, including support for function overrides in a threaded scope dependent manner. The present invention also supports broadcast (multiple call) call configurations and run-time examination of function registries. In the preferred embodiment, the system comprises the following:

A threaded environment providing the following abilities:
  a) Association of arbitrary data, in this case function registries, with threads;
  b) Hierarchical nesting of thread contexts with corresponding UI context relationships;
  c) Ability to pass 'events' containing messages between threads;
  d) Environment supplied transparent invocation of certain events;
  e) Ability to 'look-up' threads based on a unique thread/widget ID;

A series of function registries associated with each context in the system, including a global registry whose scope encloses that of all others. Within these registries, using API calls, functions can be registered by name (as a text string) by specifying the ancestral scope at which the registration should occur; and In the preferred embodiment, an API that permits execution of functions by name that internally searches the relevant thread's registries in an order determined by gradually widening scope (as defined by the threaded environment) and which causes the necessary functions to be executed, with the parameters supplied by the caller, either in the calling context ('near') by direct call, or in the registering context ('far') by call in response to an appropriate event. A 'reply' function may also be specified which allows function results to be returned to the calling context in a synchronous or asynchronous manner.

Furthermore, the present invention provides a system for implementing threaded type-dependant asynchronous invocation of a set of named logical actions in thread dependant, scoped, manner including support for overriding the invoked functionality within any scope, passing of arbitrary parameters from invoker to invoked, type ancestry dependant inheritance of invocation behaviors (including scope dependency) based on a threaded symbolic registry scheme such as described above. Finally, a hyperlinking system uses these features to dynamically modify a user interface such that any text in a user interface can be hype inked to one or more sets of types data using hyperlink dictionaries that may be user defined or global. Additionally, clicking on such a hyperlink can invoke one or more functions (as described above) based on the scope of the functions permitting display of wide ranging data and media types.

It is anticipated that further modifications and extensions will also be provided. For example, the system could be extended to support the ability through API calls to associate arbitrary data and logical flags with registered functions. Additionally, they system could be extended to support the ability to inhibit/enable functions in the registry(s) by scope through described API calls.

BRIEF DESCRIPTION OF THE FIGURES

[NONE]

DETAILED DESCRIPTION OF THE PREFERRED EMBODIMENT

The technology described herein preferably takes advantage of a number of other key technologies and concepts. Ideally, the reader would be familiar with the technology described in the patent applications listed below in order to fully understand the breadth and uniqueness of the present invention. For these reasons, the following technologies, which have been previously described in the following related patent applications, have been fully incorporated herein:
  1) Appendix 1—"Lexical Patent"
  2) Appendix 2—"Memory patent"

3) Appendix 3—"Types Patent"
4) Appendix 4—"Ontology patent"

It is important to understand that the invention described herein can be added to any information accessed by the user regardless of source, internal or external. While its application will be described with reference to web pages for simplicity, this is but one example of its application and should not be construed as a limit to the scope of the present invention. The present invention directly addresses the loss-of-focus issue described above by allowing the user to define and modify his or her own hyper-linking environment and allows all of the knowledge of the user or the user's organization to be used to analyze and modify the appearance of the information being displayed. The architecture, within which the user performs his daily activities, and the user interface (UI) it presents, provides and automates this facility. More specifically, when a hyperlink is clicked, the architecture identifies the nature, type and location of the datum to which that hyperlink refers. Once the datum type has been retrieved, the architecture automatically launches the appropriate display behaviors to show the target datum to the user in the most appropriate manner, which in many cases will be context dependant.

The present invention is built up in three layers. The first layer (as exemplified by the API calls starting with OC_) is targeted at the more general problem of symbolically invoking functionality within a complex threaded environment in a manner that permits both local and remote synchronous and asynchronous function invocation and customization of the actual functionality invoked in a context sensitive and scope dependant manner. The second layer (as exemplified by the API calls starting with DB_) ties this capability to a type-dependent, ontology-based invocation system. The third layer provides the capabilities required to handle and display ontology-centric hyperlinks.

Threaded Symbolic Function Calls

The first layer provides functionality that permits threaded, scope dependant symbolic function invocation. Specifically, the first layer allows function calls to be made between and across threads in a symbolic, possibly asynchronous manner. Throughout this discussion, threads will be referred to as 'widgets' where each widget in the system has a unique widget ID that can be used to reference it.

As an initial matter, it is helpful to describe the preferred thread architecture of the substrate within which the functionality described herein is intended to run, and which confers the ability to represent nested scope. Other substrate architectures are possible provided that they support at least some portion of the scope behaviors described herein. The need for scope dependant configuration of invoked functionality, and its complete divorcing from the consideration of the invoker, permits large complex systems to be easily assembled out of flexible adaptable building blocks. This is a problem that is poorly handled by more conventional approaches such as object-oriented programming, for example. While such approaches could be used, this is not the preferred approach.

The following description refers to compiled, executable code as 'atomic widgets'. Atomic widgets may be combined and nested within higher-level widgets (that generally do not contain executable code) and are referred to as 'compound widgets'. Collectively, atomic widgets and compound widgets will be referred to as 'widgets'. In addition to logical nesting within compounds, the present invention also provides a corresponding layout of widgets within the user interface (UI) implied by such nesting. Compound and atomic widgets may be combined into higher-level compound widgets to an arbitrary number of levels. In the preferred embodiment, widgets can be grouped into loadable and executable 'applications', comprised of one or more (possibly nested) widgets, which are known as 'views'. Generally, there will be one or more windows within the user interface that correspond to a given view. Views in turn can be combined into logical groups of views known as view packs. Further, any widget within a view or view pack may cause the launching of another view or view pack, and the launch dependency between these various views in the system is tracked and utilized as part of determining 'ancestry'. Thus, we have the concept of a scope or ancestry chain for any given widget context running in the system that contains some or all of the elements depicted below:

Global Environment Context

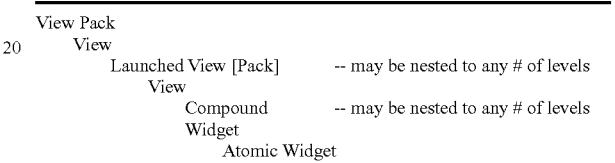

View Pack
   View
      Launched View [Pack]   -- may be nested to any # of levels
      View
         Compound   -- may be nested to any # of levels
         Widget
            Atomic Widget Because there is a close match between UI window layout and the logical nesting of widgets described above, this ancestry chain closely matches the perceived visual context of any given widget. This approach permits use of the scope defined by the ancestor chain to configure the behaviors and resultant appearance of invoked functions into the context from which they are invoked. For simplicity, the current widget's scope will be defined to be zero on a signed number line. Increasing widget ancestry can then be referenced as +1 for the parent, +2 the grandparent etc. This positive incrementing continues until the nesting within a given view is exhausted. The ancestry is also defined in the opposite direction. For example, switches to −1 (local view scope) and increases in the negative direction with −2 being view pack scope, −3 launching view scope (if any), and so on in the negative direction until the chain runs out. Finally, global environment scope within which all other scopes are defined can be reference using the constant −32768.

In the preferred embodiment, the implementation of symbolic function registries in the present invention utilizes string lists (as described in the Memory Patent) to store the information passed on the call to OC_RegisterFunction( ). Each scope node discussed above may have such a registry associated with it if any functions have been registered. A such, the present invention access these registries and looks for registered function in expanding scope order during a call to OC_CallSymbolicFunc( ). The basic scope logic is implemented by the internal function OC_SymbolicFuncLoc( ) the pseudo-code for which is given below:

```
static ET_StringList OC_SymbolicFuncLoc(    // obtain function
address list
             int32      awidgetID,           // I:Widget ID(0 =
current)
             int32      *aScopeID,           // O:scope widget
                                             ID
             int32Hdl   *index,               // O:~0 term. match
index list
             charPtr    aFuncName,           // I:symbolic
function name
             int32      options,             // I:variouS logical
```

-continued

```
options
            int32       aMatchWidgetID,    // I:matching widget
ID,or 0
            ET_         aMatchFuncAddr     // I:Matching fn.
            Symbolic
            Func
address or NULL
            )                              // R:String List or
NULL
{
    if ( aWidgetID == kGlobalSCOPE )
        scopeWP = 0;
    else
    {
        scopeWP = convert aWidgetID & aMatchWidgetID to reference
        vh = view handle of scopeWP
    {
    myIndex = -1;
    if ( awidgetID != kGlobalSCOPE )
        while ( !ctr && scopeWP )         // search widget's
ancestry chain
        {
            if ( aScopeID ) *aScopeID = scopeWP->widgetID;
            sL = scopeWP function registry;
            if ( sL )
            {
                do
                {
                    myIndex = search sL for name specified
                    if ( name found )
                    {
                        if ( ! (options & kIncludeSuppressed) )
                            if ( function       // check ! supressed
                            suppressed )
                                continue;
                        extract all required values
                        add myIndex to *index array
                    }
                } while (myIndex >= 0)
            }
            if ( !ctr )
            {
                scopeWP = parent widget of scopeWP
                if ( !scopeWP )             // ran out of
widgets!
                {
                    if ( in a view pack )   // now work through
views ...
                        scopeWP = view widget of prime
                        view of pack
                    else if ( this view was launched by another )
                    {
                        scopeWP = view widget of the launcher
                    } else scopeWP = 0;
                }
            }
        }
    if ( !ctr && !(options & kNoGlobalSearch) )   // try the global
registry ...
    {
        if ( aScopeID ) *aScopeID = 0;
        sL = globa registry
        myIndex = -1;
        if ( sL )
        {
            do
            {
                myIndex = search sL for name specified
                if ( name found )
                {
                    if ( ! (options & kIncludeSuppressed) )
                        if ( function suppress-   // check ! supressed
                        ed )
                            continue;
                    extract all required values
                    add myIndex to *index array
                }
            } while (myIndex >= 0);
        }
    }
    if ( !ctr )
        sL = NULL;
    return sL;
}
```

In this embodiment, the function above returns a string list containing all matching functions registered at the relevant scope. From this information, the implementation of most routines in the function registry API can be deduced. For example, one implementation of the function OC_CallSymbolicFunction( ) is as follows:

```
Boolean OC_CallSymbolicFunction(          // call a symbolic
function
            charPtr     aFuncName,         // I:symbolic
function name
            void        *aFuncpara-        // I:parameter (or
                        meter,
NULL if N/A)
            ST Symbolic- aReplyFunc,       // I:Address of reply
            Reply
fn. or NULL
            int32       aMatch-            // I:Matching widget
                        WidgetID,
ID or 0
            ET_Symbolic- aMatchFunc-       // I:Matching fn.
            Func         Addr,
address or NULL
            int32       options            // I:Various logical
options
            )                              // R:TRUE for
                                           success
{
    sL = OC_SymbolicFuncLoc (0, NULL, &index, aFuncName, ...);
    if ( !sL || index ) return NO;
    i = count the matches returned
    if ( !i ) return NO;
                                           // no functions
                                           found
    ofP = NULL;
    for ( i-- ; i >= 0 ; i-- )             // call fn. for every
element
    {
        wid = 0;
        sP = get function address
        if ( sF )
        {
            wid = get widget ID
            farFunc = near or far call?;
            id = current widget ID
            if ( wid == id )               // both widget IDs
the same
                farFunc = NO;
            if ( farFunc )                 // call far in
original context
            {
                ffP = (OC_FarFuncDescPtr) allocate heap pointer
                ffP->func = SF;
                if ( ofP ) ofP->nextFunc = ffP;  // build up a doubly
linked list                    ffP->prevFunc = ofP;
                ffP->options = options;
                strcpy(ffP->name,aFuncName);
                ofP = ffP;
                ffP->reply = aReplyFunc;
                ffP->aFuncParameter = aFuncParameter;
                post wake message to registerer's context
                referencing ffP
                aFarFunc = YES;
            } else                         // near functions
called here
            {
                (sF) (aFuncName,           // call it 'near'
                aFuncParameter,id,options);
                if ( aReplyFunc )          // call the reply fn.
```

-continued

```
            (aReplyFunc) (aFuncName,
                aFuncParameter,id,options);
            }
        }
    }
    if ( !aFarFunc && aFuncParameter && !(options &
kNoParameterDelete) )
        dispose of (aFuncParameter);         // if no far funcs,
delete
    return YES;
}
```

In the wake event handler for a far function, the logic may be implemented is as follows:

```
static void OC_FarFunkWake      (           // far function
wake handler
        ET_NfyRecordPtr  theWakeEvent       // I:The wake
event record
                         )                  // R:void
{
    ffP = (OC_FarFuncDescPtr) extract from theWakeEvent
    if ( !ffP ) return;
    lastGuy = ! ffp->nextFunc && !ffP->prevFunc;  // are we the last
function?
    if ( ffp->func )
        (ffP->func) (ffP->name,ffP->         // call symbolic
        aFuncParameter,...) ;
function
    if ( lastGuy && !ffP->reply && ffP->aFuncParameter &&
        ! (ffP->options & kNoParameterDelete)
        dispose of(ffP->aFuncParameter)      // de-allocate if
no reply
    if ( ffP->reply )
    {
        ffP->func = ffP->reply;
        ffP->reply = NULL;
        post wake message back to caller's context referencing ffP
    }else
    {                                        // remove from
linked list
        if ( ffp->nextFunc ) ffP->nextFunc->prevFunc = ffP->prevFunc;
        if ( ffP->prevFunc ) ffP->prevFunc->nextFunc = ffP->nextFunc;
        dispose of(ffP)
    }
}
```

The code above is simply one embodiment of a process for achieving this result. Namely, retrieving functions registered at a given scope and calling the symbolic function as appropriate. As explained above, this functional layer provides threaded asynchronous function calling behavior.

Threaded Type Dependant Invocation

In the preferred embodiment, the symbolic function capability described is extended to a type and ID dependent form suitable for use in an abstract type-dependent invocation scheme. This approach would preferably use a run time accessible type system (a methodology for "typing" data) and corresponding system ontology. In the preferred embodiment, the run time accessible types system is the types system described in the Types Patent and the system ontology is the ontological framework described in the Ontology patent. Other embodiments, however, could also be used to used.

With a types system and ontology in place, the type-less symbolic functions can be extended to a strongly typed action dependant form by taking advantage of the fact that function names are strings. Specifically, by adding a type dependent wrapper layer (the DB_calls described below), type names and unique ID numbers can be converted into unique sym-bolic function names by using the C programming language sprintf( ) function. For example, the internal symbolic name for an invoker for the action "myAction", on the type "MyType" having unique ID number "1234" would be "myActionMyType1234". This form corresponds to what is internally registered by the function DB_OverrideForType-AndItem( ). The corresponding form for DB_OverrideFor-Type( ) would be "myActionMyType". Implementation of the other DB_Override . . . ( ) style functions in the API follows directly from this approach. Using the definition of the invocation record type ET_DBinvokeRec (given below), the basic logic for the function invocation function (DB_Invoke( )) could be implemented as follows:

```
ET_ViewHdl DB_Invoke   (                    // Invoke by type
                                                and
action
            OSType          aData-           // I:Key Data type
                            Type,
            charPtr         action-          // I:Action name or
                            Name,
NULL
            ET_DBInvokeRecPtr  iR,           // IO:The invoker
record
            int32           options          // I:Various logical
options
                         )                  // R:non-zero for
success, or NULL
{
    dT = aDataType;
    if ( !iR->dataType )
        iR->dataType = aDataType;
    if ( aDataType )
        dp = resolve data type(aDataType);  // check we know
                                                the
data type
        while ( !dp )                       // nothing specific
try ancestors
        {
            tid = TM_KeyTypeToType-         // get ancestral key
                ID(dT,NULL);
type
            if ( tid )
                tid = TM_GetParentTypeID(NULL,tid);
            if ( !tid )
                return NULL;
            dT = TM_GetTypeKeyType(NULL,tid);
            dp = resolve data type(dT);
        }
        iR->options |= kIsClientServerInvokation;
        aDataType = dT;
    }
    if ( !actionName )
    {
        if ( !iR->action[0] )
            strcpy(iR->action, "Display");
        actionName = iR->action;
    } else
        strcpy(iR->action, actionName)
    stillLoop = YES;
    while ( stillLoop )
    {
        stillLoop = NO;
        strcpy(fullName,actionName);       // first look for
desired form
        if ( dp && !iR->dataItemType[0] )
            strcpy(iR->dataItemType,dp->name) ;
        strcat(fullName, (dp) ? dp->name : iR->dataItemType) ;
        strcpy(nameWithID, fullName) ;     // form is
'DisplayMyDataTypeName'
        sprintf(tmp,"%lld",iR->anItemID.id)
        strcat (nameWithID, tmp) ;         // name and ID
override ?
        if ( ! (options & kNoNameAndIdOverride) && resolve fn. )
        {                                  // check for
supression
```

-continued

```
            if ( OC__WidgetIDtoAncestorSpec
              (0,aScopeID,&ancestorSpec) )
            {
                if ( !DB__OverridesForTypeAndItemDisabled
                  (aDataType, . . .) )
                    idOverrideOK = OC__CallSymbolicFunction
                      (nameWithID, . . .);
            }
        }
        if ( !idOverrideOK )
        {                                    // no name and ID
override. . .
            if ( ! (options & kNoNameOverride) &&
              resolve fullName )
            {                                // discard the ID
part
                if ( OC__CallSymbolicFunction(fullName,iR, . . .) )
                    return (ET__ViewHdl)-0;
            } else if ( aDataType )
            {
                dT = aDataType;
                vIf = DB__DoesInvokerExist(dT,actionName);
                if ( !vIf )
                {
                    tid = TM__KeyTypeToTypeID(dT,NULL);
                    if ( tid )               // try climbing for
ancestors
                        tid = TM__GetParentTypeID(NULL,tid);
                    if ( tid )
                    {
                        aDataType = TM__
                          GetTypeKeyType(NULL,tid);
                        if ( aDataType)
                        {
                            dp = DB__ResolveDataType
                              (aDataType,NO);
                            while ( !dp )    // up again!
                            {
                                tid = TM__KeyTypeToTypeID
                                  (aDataType,NULL);
                                if ( tid )
                                    tid = TM__GetParentTypeID
                                      (NULL,tid);
                                if ( !tid )
                                    return NULL;
                                aDataType = TM__KeyTypeTo-
                                  TypeID(dT,NULL);
                                (NULL,tid);
                                dp = DB__ResolveDataType
                                  (aDataType,NO);
                            }
                            if ( dp )
                                stillLoop =     // climb up and try
                                  YES;
again. . .
                        }
                    }
                } else
                    return (vIf) (iR) ;
            }
        }else
            return (ET__ViewHdl)-0;
    }
    return NULL;
}
```

Hyperlinks

Given the type dependant, threaded invocation methodology described above, the next step is to implement the user-centric hyperlink capability. As an initial matter, the present invention uses a flexible dictionary system that can be used to build up lists of hyperlink targets and to rapidly look up the information necessary to invoke those targets when clicked on. The lexical analysis capability described in the Lexical Patent is the preferred system used to implement such a flexible dictionary system. Again, other lexical analyzer or dictionary system could also be used. In the context of hyper-linking, these dictionaries, which are implemented as lexical analyzer DBs, will be referred to as hyperlink domains. Given the lexical analyzer capabilities, adding an item to a domain (as in DB_AddToDomainDictionary) can be achieved by calling LX_Add( ) with the token string being the name involved and the token number being the corresponding unique ID. Persistence of these domains can be achieved by loading and saving the domain recognizer to/from a file placed within a hierarchical directory tree whose structure matches that of the underlying system ontology. Furthermore, looking up hyperlinks (as in DB_IsHyperlinkTarget) can be achieved by making a call to LX_Lex( ) (or a corresponding functional call). In the preferred embodiment, hyperlink domains can also be placed into active/inactive status. This can be most easily achieved by loading the corresponding lexical DBs into a linked list of such recognizers in memory on the local machine. The implementation of all hyperlink routines in the API below uses these calls to perform the functions described below.

The final component used by the present invention to support dynamic hyperlinks is a GUI framework that supports a multi-styled text display component. In other words, the hyperlink code (see PU _NotifyHyperlinkChange) implemented by the user environment must be able to examine the text in a control, and should a hyperlink phrase be found, must be able to alter the style of that portion of the text so that it is displayed appropriately for a hyperlink in the UI. This capability is supported by most non-trivial GUI frameworks (such as internet browsers) and is well-known to those skilled in the art. By combining a framework that permits alteration of text styles to indicate hyperlinks and in which the environment supplied calls DB_Invoke( ) (which is tied to a system ontology) whenever the user clicks on any text that has been altered in this manner, we have a complete user-centric type and scope dependant hyperlink system.

API Definitions

The API descriptions that follow give a sample embodiment of one basic public API that could be used by the present invention. This API is intended to be illustrative of the kinds of calls required and is by not intended to set forth any required implementation or otherwise exhaust the possible implementations. An API listing is also provided in Appendix A.

In the preferred embodiment, the function OC_RegisterFunction( ) registers a function by symbolic name for a given scope, so that it can be invoked from any other widget within that scope. The primary use of this functionality is to create a hyperlink registry to allow widgets to jump to other named locations without having to actually know where the location is or what the function it is calling actually does. In the preferred embodiment, the function registry is hierarchical with a registry potentially being attached to every ancestral level of the widget (including the widget itself). In this manner, it is possible to override the meaning of a function ("whoKnowsWhat") for an individual widget, a compound widget, a view, a view pack, or globally for the environment. This provides a great deal of flexibility in defining links between widgets and also allows certain functions to be overridden locally so that code that uses them can be modified without modifying the code itself. Preferably, functions specified as 'kFarFunction' are actually called in the context of the widget that registered them, not in that of the caller. On the other hand, 'near' functions are called in the context of the widget that makes the OC_CallSymbolicFunction( ) call. A typical symbolic function prototype might appear as follows:

```
void mySymbolicFunc (          // Symbolic function
        charPtr   aFuncName,   // I:Symbolic function name
        void      *aParameter, // IO:Parameter/Reply area (or NULL)
        int32     widgetID,    // I:Widget ID of caller
        int32     options      // I:Various logical options
        )                      //R:void
```

Preferably, any widget registering a function will de-register it at the functions terminate entry point. Otherwise, there is the possibility that the function may be called after the widget itself is dead. In the preferred embodiment, a routine, such as OC_DeRegisterAllFuncs( ), can be called to deregister any and all functions registered by a given widget regardless of the scope for which they were registered. An ancestorSpec of 'kViewPackSCOPE' is equivalent to 'kLocalViewSCOPE' if the calling widget is not within a view pack. When writing a 'kNearFunction' function, the near functions are called in the context of the widget that makes the OC_CallSymbolicFunction( ) call. In general the data associated with the installing widget may not be reliable and is it not safe to assume anything about the calling widget unless what the function requires/assumes in the 'aFuncDesc' parameter passed to this function is clearly described. A set of options, such as the 'kDistinguishFuncPtrs' options, can be used to allow multiple registrations of a given function name within the same widget but using distinct function addresses. Alternatively, only a single function 'funcName' can be registered for any given widget. For low-level libraries, when registering global type functions (e.g., "LanguageChange"), it is often helpful to distinguish registrations by different libraries.

In the preferred embodiment, the function OC_DeRegisterFunction( ), can be used to remove a registered function from the function registry for the scope specified. If the function was not found at the specified scope, this function returns FALSE (and preferably does not log an error).

In the preferred embodiment, the function OC_DisableFunctionO can be used to disable a registered function from the function registry for the scope specified. If the function was not found at the specified scope, this function returns FALSE (and does not log an error). Once disabled, the function will not be called until a corresponding OC_EnableFunction( ) call is made (for the same scope but not necessarily by the same widget). In the preferred embodiment, the function OC_EnableFunction( ) can be used to enable a registered function from in function registry for the scope specified if it has been previously disabled by a call to OC_DisableFunction( ). If the function was not found at the specified scope, this function returns FALSE (and does not log an error). Since functions can be enabled and disabled by any widget within the scope, this mechanism serves as a convenient means of controlling function calls without having to add logic to the caller. In the preferred embodiment, the function OC_FunctionIsDisabled( ) allows you to determine a specified function has been disabled for the selected scope. Similar functions could also be provided that enable or disable a function based on other factors, such as the time of day or date.

In the preferred embodiment, the function OC_DeRegisterAllFuncs( ) can be used to remove all functions registered by the current widget (at any scope) from the function registry. If functions are removed successfully, TRUE is returned, otherwise FALSE is returned.

In the preferred embodiment, the function OC_CallSymbolicFunction( ) can be used to call a symbolic function from the symbolic function registry. Note that the result of this call reflects only whether the specified function could be found, not the result of actually calling it. In order to obtain a result back from a symbolic function (near or far), the address of a reply function (of type ET_SymbolicReply) must be provided which will be called in the same widget context as the OC_CallSymbolicFunction( ) call, and will be passed the 'aFuncParameter' value originally supplied (and also passed to the symbolic function). The parameter, if used, would be a pointer to a heap allocated block in the preferred embodiment. This approach allows the symbolic function to modify the value at that address, and allows the reply function (if specified) to examine the modified location to determine the result and then take whatever additional steps are necessary in the context of the original caller. In the preferred embodiment, the wrapping code possesses, dispossesses, and deletes the allocation (if used) according to the following rules:

1) If 'aReplyFunc' is specified, the allocation will be disposed of using KILL_PTR( ) after the reply function has been invoked.
2) If 'aReplyFunc' is not specified, the allocation will be disposed of using KILL_PTR( ) after the symbolic function has been invoked in the context of the registering widget for a 'far' function, or the calling widget for a 'near' function.

Far symbolic functions are actually called from within the event loop of the registering widget so those functions are responsible for causing the main loop of the widget to react (if required) either by posting an event/message, or other in-widget communications mechanisms. In particular, if the symbolic function needs to do something which might potentially cause the widget to be re-scheduled (such as UI operations or communication), it should preferably cause this to occur in the main widget loop, not do it itself.

Near symbolic functions are called immediately in the callers context and unlike far functions do not return to the caller until the function, and if specified, the reply function, have both been executed. If multiple different widgets have registered for the same symbolic function name at the effective scope, then every widget/function will be called (near and/or far) in succession when 'aMatchWidgetID' is 0. This approach would permit broadcast type operations, for example. In the preferred embodiment, if any registration under the same name has occurred with a tighter scope, then the widget having the tighter scope will be called thereby suppressing all calls at the looser scope.

When multiple calls are made in this manner, all called functions share the identical 'aFuncParameter' storage, which is disposed when the last invoked function/reply completes. In the preferred embodiment, a number of options bits are reserved to allow the type of parameter passed in 'aFuncParameter' to be specified in those cases where a function accepts multiple parameter types. These definitions preferably have a one-for-one correspondence with the data type definitions for the options word. Some of the parameters that could be used include:

kSymbParamTypeInvRec—parameter is an ET_DBInvokeRecPtr
kSymbParamTypeInteger—parameter is a pointer to a long
kSymbParamTypeString—parameter is a C string pointer In one embodiment, the 'kNoParameterDelete' suppresses all possession, dispossession, and deletion of the 'aReplyFunc' value. This may be appropriate if the memory is to stay permanently owned by one widget, or if 'aFuncParameter' does not actually represent a heap pointer.

In the preferred embodiment, the function OC_CountSymbolicFunctions( ) can be used to count the number of widgets that are registered for a given symbolic function name at the effective scope. There are certain applications of symbolic functions that operate as a broadcast mechanism whereby multiple widgets register for a given symbolic function at a specified scope and all are called/invoked when the OC_CallSymbolicFunction( ) call occurs. In most cases, the caller does not care how many functions are actually being triggered. In the event that it does, however, it may count the number and use the widget ID array returned by this function to pass to the 'matchWidgetID' parameter of other functions in order to select just a single instance (rather than all or just the first depending on the implementation). The number of widgets registered for a function at an effective scope is returned. In the preferred embodiment, to specify a search of the global registry only, use '*awidgetID' =kGlobalSCOPE on entry. '*aScopeID' (if specified) will be 0 on exit if the function was found in the global registry. The caller will dispose of the array returned in 'widgetIDs' when no longer required.

In the preferred embodiment, the function OC_ResolveSymbolicFunction( ) can be used to determine if a given symbolic function exists, and if it does, the address of the function. The widget itself would not normally call the function (except by using OC_CallSymbolicFunction( )) because many such functions are designed to be called in the context of the widget that registered them and fail if called from elsewhere. If the function pointer is not returned, then the function will return NULL. In this embodiment, to specify a search of the global registry only, use '*awidgetID'=kGlobalSCOPE on entry. '*aScopeID' (if specified) will be 0 on exit if the function was found in the global registry.

In the preferred embodiment, the function OC_SetSymbolicFuncData( ), can be called to attach data (or information) of a specified type to a registered symbolic function. A typical use of this function would be to attach an icon or picture to a function so that any function that is going to invoke the symbolic function can display the icon or picture associated with the function/destination. There are many other uses of this capability including communicating through the content of the data handle. The primary purpose of the ability for a sufficiently smart 'caller', however, is to establish certain information about the 'callee' before the call is made. If data is allocated and attached to a registered function, it must be deallocated at the time the function is de-registered. If an attempt is made to set function data from a widget other than the one that registered the function, it will fail. If operation is successful (meaning the registered widget was able to set function data), 0 is returned, otherwise an error number is returned.

In the preferred embodiment, the function OC_GetSymbolicFuncData( ) can be used to obtain the data (and its type) attached to a registered symbolic function. This information is associated with the function by the widget that registered it using OC_SetSymbolicFuncData( ). The purpose of this data is to allow callers to obtain additional information about the function, without actually having to call it. If the 'aDataHandle' and 'aDataType' values come back as zero, there is no data associated with the function. Error numbers are preferably returned in the case of failure. The handle returned belongs to the widget that registered the symbolic function so any caller would preferably not de-allocate it or modify the contents (unless that is it's purpose).

In the preferred embodiment, the function OC_SetSymbolicFuncFlags( ) can be called to set the flags word associated with a symbolic function. Unlike the data associated with a symbolic function, the flags word can be altered by any widget within the scope. When setting the flags, it may be helpful to get the current flag settings using OC_GetSymbolicFuncFlags( ), alter only those bits of interest, then set the flags using OC_SetSymbolicFuncFlags( ). Failure to follow this protocol may result in confusion in cases where multiple widgets are manipulating the flags. In the preferred embodiment, the function OC_GetSymboticFuncFlags( ) obtains the flags word associated with a registered symbolic function. This information is associated with the function by the widget that registered it using OC_SetSymbolicFuncFlags( ). The purpose of this data is to allow callers to obtain additional information about the function, without actually having to call it.

In the preferred embodiment, the function OC_GetSymbolicFuncDesc( ) can be used to obtain the descriptive text (if any) associated with a registered symbolic function. If no description was supplied, the returned string contains "???". If descriptive text is not found, NULL is returned. In all other cases, a descriptive text handle is returned. The caller should dispose of the handle returned when no longer required.

In the preferred embodiment, the function OC_ListSymbolicFunctions( ) can be used to return an alphabetized, <CR> separated list of all registered symbolic function names for the specified scope. preferably, the entries in the list have the format "www functionName" where 'www' is the widget ID of the widget that registered the function. To obtain the function description, the function OC_GetSymbolicFuncDesc( ) can be called and passed the 'www' and 'functionName' values. This function returns a function list, or NULL if the list is empty. The caller should dispose of the handle returned when no longer required.

In the preferred embodiment, the function OC_WidgetIDtoAncestorSpec( ) can be used to convert a widget ID to the corresponding ancestor spec. If the widget ID is not ancestral to the calling widget, the function returns FALSE. In the preferred embodiment, the function OC_AncestorSpecToWidgetID( ) can be called to return the widget pointer corresponding to the ancestor specified relative to a given widget ID. The symbolic function registry uses this type of ancestor specification. In the preferred embodiment, the function OC_LowestCommonAncestor( ) returns the widget ID for the lowest common ancestor of the two widget IDs supplied (if it exists).

In the preferred embodiment, the function DB_DefineHyperlinkDomain( ) allows a hyperlink domain to be defined. The automatic hyperlinking facility assumes that hyperlink targets can be broken down first by data type (see DB_DefineDataType) and then within a given data type (People for example), as a set of groups or domains where each domain has a 'dictionary' (which is actually a lexical analyzer DB—see LX_MakeDB in the Lexical Patent incorporated herein) which contains a list of all target members that fall into that domain. In the example of the data type 'people', possible domains might be things such as politicians, military personnel, or company staff. It is permissible that a given target (or person) be a member of any number of domains, providing that the person is unique within any given domain, or if not unique, is referenced by a different name for each multiple occurrence (e.g., 'F16' and 'Falcon' might refer to the same target). Domains may be either system domains, meaning that the domain is common to all users of the system and are maintained by the system administrator, or they may be user domains, meaning that the domains are unique to each user of the system. If multiple domains recognize a given target, the first one to fire (which will be the last one to be activated) takes precedence regardless of the system or user attribute. Firing order can be controlled, if desired, by ensuring the preferred domain is activated after that of the domain over which it is preferred. In general, active system domains are loaded before user domains during startup, which normally has the effect of giving user domains precedence over system domains. Again, however, this precedence can be altered as desired. The effect of a hyperlink click is to invoke the "hyperlinkAction" action (the default if none is specified is "Display") for the data type of the domain which recognized the target. This means that hyperlinking is subject to all the same overriding and redirecting behaviors available via the DB_Invoke( ) function. This is useful because hyperlinks can be locally redirected when appropriate (with nested scope) while still following the default link if no override is found.

Once defined, a domain preferably becomes permanently known due to the fact that a domain dictionary file is created in the appropriate folder. The way to remove a domain is to call DB_UnDefineHyperlinkDomain( ). Defining a domain that is already known or for which a domain dictionary file already exists, has no effect (this function returns TRUE with no action). Domains may also be organized into hierarchies by specifying the hierarchy path as a series of ancestral domains separated by colons (e.g., "animals:mammals: people"). This feature allows whole sub-trees to be activated or de-activated at once and allows flexibility in organizing domains according to any desired breakdown. Since a folder hierarchy is created to reflect the domain specification, it is important to ensure that all fields of a domain name meet the naming criteria for the underlying file system. In the preferred embodiment, all necessary ancestral folders will be created automatically when the domain is defined so it is not necessary to explicitly create the tree in a top down manner. To avoid confusion, domain names should be unique. Furthermore, it is not desirable to define a system and user domain name of the same name, nor is it desirable to have a domain name of a different 'aDataType' with the same name.

In the preferred embodiment, the function DB_AddToDomainDictionary( ) can be used to add a new target to the specified active hyperlink domain dictionary, thereby making it available as a hyperlink destination. To add targets to an inactive domain, it is best to temporarily activate (but not compact) the domain first. The most efficient way to add a series of targets to a given domain is to first ensure the domain is active (and not compacted), then add the targets (specifying the 'kNoSaveDomainToFile' option), and finally save the domain by making a call without the 'kNoSaveDomainToFile' option and NULL specified for 'aTargetName'. Lastly, the domain should be deactivated if it was not originally active. Preferably, this logic is handled automatically within a domain populator function as called via DB_CallDomainPopulator( ). For correct operation, hyperlink targets MUST start with an alphanumeric character, not a delimiter or whitespace. Alphanumeric characters may be in an alternate language as well as English so hyperlinks can operate in any language or script system.

In the preferred embodiment, the function DB_SubFromDomainDictionary( ) can be used to remove a target from the specified active hyperlink domain dictionary, thereby making it unavailable as a hyperlink destination. To remove targets from an inactive domain, the domain should be temporarily activated (but not compacted) first. If a series of targets to a given domain will be removed, the domain should be activated (or ensure the domain is active and not compacted), then calls made to remove the targets (specifying the 'kNoSaveDomainToFile' option), and the domain saved by making a call without the 'kNoSaveDomainToFile' option and NULL specified for 'aTargetName'. Lastly, the domain should be de-activate if it was not originally active.

In the preferred embodiment, the function DB_NotifyHyperlinkChange( ) should be called whenever some kind of change is made to the hyperlink dictionaries that requires the UI to be refreshed in order to determine again which hyperlinks are available. In the preferred use of this hyperlink API, this function does not need to be explicitly called since the calls are made automatically as appropriate.

In the preferred embodiment, the function DB_IsHyperlinkTarget( ) can be used to determine if a given string is a hyperlink target and, if so, what the data type, domain name, action, and unique ID are for that target. This function may be used to perform different hyperlinks using DB_Invoke( ) while specifying additional options or parameters based on detailed knowledge of the target, domain, or data type involved. Normally, DB_HyperlinkToTarget( ) would be used to explicitly invoke a hyperlink via some mechanism other than the automatic hyperlinking behavior provided for all text controls in the system. By using this function (followed by a call to DB_Invoke or DB_HyperlinkToTarget), it is possible to hyperlink to targets that are not in active domains. On input, if 'aDataType' is NULL or non-NULL with a value of zero, this is taken to imply that any key data type is acceptable, otherwise the value of '*aDataType' is used to restrict the search to only those active domains of the data type specified. On output, if 'aDataType' is non-NULL, it will hold the value of the key data type for which the target was found, or zero if not found. Additionally, on input, if 'aDomainName' is NULL, or non-NULL with a string value of "", this is taken to imply that any active domain name is acceptable, otherwise the value of the string pointed to by '*aDomainName' is taken to be a domain name in/below in which to look to the exclusion of all others. On output, if 'aDomainName' is non-NULL, the contents of the buffer to which the parameter value points will be replaced by the domain name in which the target was found (or an empty string if not found). Note that 'aDomainName' may be a partial path in which case the search for targets is restricted to all active domains below that path. In this embodiment, if and only if 'aDataType' and 'aDomainName' are specified explicitly, inactive domains will also be examined using this function. In all other cases, only active domains are considered. Because the contents of 'numChars' is set to the actual number of characters consumed when scanning for the target (found or otherwise), the string pointed to by 'aTargetName' can be an arbitrarily long sequence of text which is scanned for possible targets by successive calls. This is exactly what the function DB_FindNextHyperlinkInText( ) does. In such a case, the end of the string being scanned can be detected by the fact that 'numChars' will be zero. When skipping over characters, this function can also use a multilingual call to determine where alphanumeric strings begin and end. This means that hyperlinks can be either in English or the alternate language. It also means that when making a series of calls for a larger string, any trailing white-space and delimiters will be skipped such that only string elements that start with an alphanumeric character and are preceded by either a delimiter or white-space will actually be examined as potential targets. By making this simplification, the process of scanning a large block of text is greatly simplified and significantly optimized for speed. For this reason, hyperlink target name strings would preferably not begin with white-space or delimiters. Note that if 'maxChar' is specified (rather than defaulting it to zero), this routine will continue to scan until it reaches the 'maxChar' character position. This means that the text string supplied may contain embedded nulls.

In the preferred embodiment, the function DB_HyperlinkToTarget( ) can be used to find a hyperlink to the specified target. Since hyperlink handling is automatically supported for any and all text controls within the system, this function would only be used to invoke a hyperlink jump by some other mechanism. If data type and domain name are both specified explicitly, this function could also be used to hyperlink to a target that is not in an active domain (although this may be slower than a call for an active domain due to the need to temporarily load the domain dictionary).

In the preferred embodiment, the function DB_IsKnownDomain( ) can be used to determine if the specified domain is known or not. A domain is known if the domain dictionary file for the domain exists (even if the dictionary is empty). A domain does not have to be active to be known, however, the corresponding data type would preferably be defined. For a non-leaf domain, the value of 'isAutoActivate' will always be FALSE.

In the preferred embodiment, the function DB_IsActiveDomain( ) can be used to determine if the specified domain is active or not. Inactive domains are not automatically used when looking for targets.

In the preferred embodiment, the function DB_ActivateDomain( ) can be used to activate the specified domain. Activating a domain causes the domain dictionary to be loaded into memory and to be used automatically whenever any text within a text control is scanned for potential hyperlinks. In other words, all targets in the domain become potential hyperlinks. If the domain dictionary is compacted when it is activated, the dictionary will occupy significantly less memory. It is preferably not to add or remove targets from a compacted dictionary. A non-leaf domain may also be specified (domain name path ends in ':') in which case all leaf domains within (to any level).will be activated. In the preferred embodiment, the function DB_DeActivateDomain( ) can be used to deactivate a specified domain. Deactivating a domain causes the domain dictionary to be removed from memory thus preventing any targets within the domain from being used as automatic hyperlinks. If a domain has been designated in the optional hyperlinking administration window as 'auto activate' then deactivating it will have only a momentary effect since it will be re-activated almost immediately as a result of the auto-activation process.

In the preferred embodiment, the function DB_GetDomainAction( ) can be used to return the invoker action associated with the specified hyperlink domain. This action is used when calling DB_Invoke( ) during the hyperlinking process. The specified domain need not be active to discover its action.

In the preferred embodiment, the function DB_SetDomainAutoFlags( ) can be used to control whether the specified hyperlink domain is auto-activated during environment initialization. By designating a domain as auto-activating, all hyperlinks in that domain will be immediately available as soon as the application runs. For such domains, the 'autoCompact' flag can also be used to determine if the domain should be compacted when it is auto-activated.

In the preferred embodiment, the function DB_SpecifyDomainPopulator( ) can be used to specify a domain populator function to be used to fill out the dictionary associated with a domain. It is often the case that hyperlink domains correspond to entries in an external database of some kind. In the preferred embodiment, a populator function would perform a query(s) on that database to obtain the set of all targets in the domain and then loop adding the targets to the domain using DB_AddToDomainDictionary( ). The hyperlink configuration view allows the invocation of the populator function for any given domain as well as configuration of which domains are to be active at any given time. At the time the domain populator is called, the domain itself will preferably have been made active (temporarily if appropriate) and the domain dictionary in memory will be empty. If the domain populator function returns FALSE, the domain dictionary in memory will be discarded and replaced (if appropriate) with the dictionary from the domain dictionary file. During all calls from within a domain populator function, the save to file behavior of DB_AddToDomainDictionary( ) is automatically inhibited for this reason. A typical domain populator function might appear as follows:

```
EngErr myDomainPopulator (          // my domain populator
    ET_TypeID    aTypeID,           // I:Data type for the domain
    charPtr      aDomainName,       // I:Domain name
    charPtr      populatorDescrip-  // I:Populator description
                 tion,
    long         aParam             // I:custom parameter or 0
                 )                  // R:0 for success,else error #
```

In the preferred embodiment, the function DB_CallDomainPopulator( ) can be used to call the hyperlink domain populator function (if there is one), passing an arbitrary parameter. When populator functions are called from within the standard hyperlink configuration UI, this parameter will be zero.

In the preferred embodiment, the function DB_UseDefaultDomainPopulator( ) can be used to specify the use of the generic hyperlink domain populator provided for persistent data types derived from the key type 'DTUM' (i.e., Datum).

In the preferred embodiment, the function DB_FindNextHyperlinkInText( ) can be used to scan a block of text looking for hyperlink targets within it. In the preferred embodiment, the function is called with both 'aDataType' and 'aDomainName' set to zero, which causes it to utilize all active hyperlink domain dictionaries to scan the text looking for a match. The data type may be restricted or a partial hyperlink domain specified. In particular, if the data type is specified and a full or partial domain name is given, this function will also find targets in any inactive hyperlink domains specified. See DB_IsHyperlinkTarget( ) for details on restricting the hyperlink search. This function forms the basis of the automatic hyperlinking capability provided by the UI encapsulation layer whereby all text in a text control is scanned and hyperlinks inserted (by turning the target word/phrase blue and underlining it, for example) and handled when clicked on by the UI layer. This function will return successive hyperlinks on each call until there are no more hyperlinks left in the text at which time it will return FALSE. The value of '*context' should be set to zero to start the scanning process, otherwise the value should be preserved between successive calls to this function.

In the preferred embodiment, the function DB_ListKnownDomains( ) can be used to return a hierarchical Lex DB containing all known system or user hyperlink domains. The resulting Lex DB may be used either to recognize domain names, or it may be used to process/list the domains using the facilities provided by LX_List( ) and the associated functions such as LX_PruneList( ) and LX_Save/RestoreListContext( ). The LexDB returned by this function includes the data type name prefix in the domain paths. Calls to other functions in this API do not contain this prefix for the 'aDomainName' parameter.

In the preferred embodiment, the function DB_ListActions( ) can be used to return an alphabetized, carriage return (<n1>) separated list of all the invoker actions supported for a given key data type. The list is repeatedly initialized until the tables are exhausted at which time the next symbol is listed and displayed. NULL is returned in case of an error. The list of actions returned may include actions for which there is not actually an invoker function (see DB_DefineInvoker) but for which symbolic overrides have been defined. The routine DB_DoesInvokerExist( ) can be used to determine if this is the case.

In the preferred embodiment, the function DB_DataTypeToName( ) can be used to return the full symbolic name of the specified key data type. In the preferred embodiment, the function DB_NameToDataType( ) returns the key data type given a full symbolic name, type name, or an alternate name. In the preferred embodiment, the function DB_OSTypeToString( ) can be used to convert a long to display as a character string. The normal application would be for use with OSTypes.

In the preferred embodiment, the function DB_OverrideForTypeAndItemExists( ) can be used to determine if an override exists for the specified key-data type and item ID and, if so, the scope relative to the asking widget. This information can be used to determine if it is possible to display a given type within a particular calling context.

In the preferred embodiment, the function DB_OverrideForTypeAndItem( ) can be called in order to register to handle a given action for a specified key data type and a unique ID of that type. This capability can be used to cause re-mapping of the view invoked on a DB_Invoke( ) call for an desired scope. This is particularly useful in ensuring that if data for a given item is already being displayed, another view is not launched but instead the existing view is simply brought forward. All items of a given type can be re-directed using DB_OverrideForType( ). In the preferred embodiment, the function DB_Invoke( ) will first check for a specific override and then for a general one. In the preferred embodiment, the function DB_UndoOverrideForTypeAndItem( ) can be used to remove an override registered using DB_OverrideForTypeAndItem( ). If no such override exists, the function will do nothing.

In the preferred embodiment, the function DB_DisableOverrideForTypeAndItem( ) can be used to suppress overrides for a given key data type, ID, and scope. The suppression remains in effect until a call to DB_EnableOverrideForTypeAndItem( ) is made. Any widget may remove the suppression, not just the one registering it. When called with 'anItemID' of zero, this function disables all ID based overrides for the type and scope. This disable is in addition to any ID specific disables that may be in effect, and can be removed by passing 'anItemID' of zero to DB_EnableOverrideForTypeAndItem( ). In the preferred embodiment, the function DR_EnableOverrideForTypeAndItem( ) can be used to remove any suppression for a given type, ID, and scope registered by DB_DisableOverrideForTypeAndItem( ).

In the preferred embodiment, the function DB_OverrideForType( ) can be called in order to register to handle a given action for a specified key data type. This capability can be used to cause re-mapping of the view invoked on a DB_Invoke( ) call for an desired scope. Note that you can re-direct specific items of a given key data type using DB_OverrideForTypeAndItem( ). In the preferred embodiment, the function DB_Invoke( ) will first check for a specific override and then for a general one. In the preferred embodiment, the function DB_UndoOverrideForType( ) removes an override registered using DB_OverrideForType( ). If no such override exists, the function will do nothing.

In the preferred embodiment, the function DR_DisableOverrideForType( ) can be used to suppress overrides for a given type and scope. The suppression remains in effect until a call to DB_EnableOverrideForType( ) is made. Any widget may remove the suppression, not just the one registering it. In the preferred embodiment, the function DB_EnableOverrideForType( ) may be called to remove any suppression for a given key data type and scope registered by DB_DisableOverrideForType( ). In the preferred embodiment, the function DB_OverridesForTypeDisabled( ) can be called to determine if overrides for a given key data type and scope have been suppressed.

In the preferred embodiment, the function DB_OverridesForTypeAndItemDisabled( ) can be used to determine if overrides for a given key data type, ID, and scope have been suppressed.

In the preferred embodiment, the function DB_OverrideForTypeExists( ) can be used to determine if an override exists for the specified key data type, and if so with what scope relative to the asking widget. This information can be used to determine if it is possible to display a given type within a particular calling context. Even though an override exists, it may have been disabled. Preferably, DB_OverridesForTypeAndItemDisabled( ) is used to determine if this is the case.

In the preferred embodiment, the function DB_DefineInvoker( ) can be used to define the view invoker function that should be called when an attempt is made to perform a specified invoker action on a given key data type. For example, the 'actionName' parameter might be "Display", in which case any subsequent call to DB_Invoke( ) for the action "Display" will result in the specified invoker function being called. The invoker function is responsible for instantiating or launching the view necessary to perform the requested action for the specified data type. Custom named invoker actions may be defined for each different data type as appropriate. In the preferred embodiment, certain predefined action types are defined and would preferably be supported by a given key data type (by defining the necessary invokers) wherever possible:

"Display" The invoker should display the selected data item as appropriate, but may not allow editing. This action is required for IP notification to be effective in this embodiment.

"Edit" The invoker should display and allow edit/update of the data item.

"Select" The invoker should display a list of items and notify the caller of any selection made by the user.

"Print" The invoker should print the selected item in the appropriate format (may not be a view launch).

"Info" Display information associated with the type (in a widget modal window, NOT actually a view launch). This action is required to place a "Show Info" button in the pending views window for this type in this embodiment.

If 'anInvokerFn' is NULL, this function can be used to define an action type to Database such that the available actions for the type can be returned on a subsequent DB_ListActions( ) call or used in action overrides. Whenever an override is registered for a defined type (i.e., from a call to DB_DefineDataType), the corresponding action is automatically registered for the type using this function. In this way, it is possible to determine the full set of actions (whether invoker based or via symbolic overrides) for a type using DB_ListActions( ). Any type manager type that is descended from a type manager type that is also a key data type will inherit the invokers and actions of the key type. In the preferred embodiment, the function DB_UnDefineInvoker( ) can be used to remove the existing definition of an invoker function for the specified key data type and action, presumably in preparation for defining a replacement function using DB_DefineInvoker( ). If invoker is removed, TRUE is returned, otherwise FALSE is returned. In the preferred embodiment, the function DB_DoesInvokerExist( ) can be used to determine if an invoker function exists for the specified key data type and action. An invoker function address is returned, if it exists; otherwise NULL.

In the preferred embodiment, the function DB_Invoke( ) can be used to call the registered invoker function for the key data type and action specified. The result is normally to instantiate or launch another view. It is also possible, however, that the function will execute entirely within the original caller's widget context. Examples of such invokers might be "Print" or "Info". This function, and the 'ET_DBInvokeRec' record that it uses, could also be used for other launcher/launchee situations even if the implementation below varies. In all cases, the 'anItemID' field of 'iR' would preferably be filled out with a unique item number that can be used by the invoked function to determine which item of a set of items is required. The caller, depending on the situation and depending upon whether the caller has already fetched the information necessary to accomplish the invocation, may also fill out other fields. In order to provide sufficient flexibility to allow general use, this routine will preferably accept an 'aDataType' value of zero as meaning that there is no true data type corresponding to this invocation, but nonetheless the routine DB_Invoke( ) is being used. In this case, it is preferably that the 'dataItemType' field of the 'iR' record contains a string describing the data type involved (e.g., "My data type"). DB_Invoke( ) will take this string, concatenate it to the 'actionName' string (for example "DisplayMy data type"), and check for the presence of a registered symbolic function with that name (see OC_RegisterSymbolicFunction( )). If such a function is found, it will be invoked.

Within this symbolic function, any action necessary to accomplish the actual invocation can be performed. The same symbolic function override capability exists for true data types, i.e., if a function "DisplayNewswire" exists for the data type whose name is 'Newswire' then it will be called in preference to the registered invoker function for 'Newswire'. This feature allows registration of invoker overrides at various scopes in order to re-direct the behavior. This feature is also what allows DB_Invoke( ) to be used as a universal invocation method (see description above). In the preferred embodiment, the functions DB_OverrideForTypeAndItem( ) and DB_OverrideForType( ) are provided to allow a convenient means of overriding (using symbolic functions) the function invoked for either a specific item ID and data type (see DB_OverrideForTypeAndItem) or a specific data type regardless of ID (see DB_OverrideForType). In the described embodiment, the 'iR' parameter must be a pointer allocated in the heap, it cannot be a stack variable. If a result (or an error) is returned, the original caller is responsible for disposing of 'iR'. In the preferred embodiment, if the 'actionName' parameter is NULL, this function attempts to invoke the "Display" action (assuming an invoker for "Display" has been defined).

In the preferred embodiment, the function PU_CursorToHyperlink( ) can be called by the environment within the widget context during idle time. This function can be used to determine what hyperlink, if any, the cursor/mouse is currently over provided that it is called within the appropriate widget context. By doing this, the environment knows when a user clicks on a hyperlink within some text and can automatically invoke the link as necessary. In systems including drag-and-drop, this mechanism is extended to automatically follow any hyperlink over which the user hovers while executing a drag so that the user can use the hyperlink mechanism as part of the navigation process during drag-and-drop operations.

In the preferred embodiment, the function PU_NotifyHyperlinkChange( ) can be called automatically by the environment in order to ensure that all text controls display the correct hyperlinks within them (see DB_NotifyHyperlinkChange). In the preferred embodiment, the function scans all widget contexts, and all windows within those widgets looking for text controls. The function then examines the text within those controls for possible hyperlinks (see DB_FindNextHyperlinkInText) and if one is found, alters the style run for the text portion that represents the hyperlink to the appearance necessary to indicate to the user that a hyperlink is present. This means that any UI displayed by the system will always show whatever hyperlinks exist for the currently active domains and this appearance will be dynamically updated should any change occur in the users hyperlinking configuration. This feature enables a truly dynamic and "real time" hyperlinking system.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. Finally, although described with reference to "Internet" terms such as hyperlinking, this invention could be applied to content from any number of different environments. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A computer system for supporting synchronous and asynchronous, inter-thread function calls, the computer system comprising:
   a memory;
   a computer program stored in the memory that when executed by the computer system enables the functioning of:
   a threaded environment, wherein the threaded environment associates an arbitrary data with one or more threads, which when associated with a User Interface (UI) context are identified by unique thread identification numbers (IDs), and includes a hierarchical nesting of thread contexts with one or more corresponding UI context relationships,
   wherein the arbitrary data comprises at least one or more function registries, wherein the function registries are associated with the one or more UI contexts in the threaded environment;
   an Application Program Interface (API), wherein the API is capable of invoking functions by name with one or more parameters supplied by a caller;

a one or more compiled, executable code, each referred to as an atomic widget, wherein the atomic widgets may be nested into one or more higher level non-executable code; and a User Interface (UI) for displaying data to a user, wherein the UI includes one or more hyperlinks to a target, wherein the hyperlink's target data is stored within an ontological framework, wherein a modification of text format within the UI to appear and behave as a hyperlink is automatic as a result of matching an arbitrary text string appearing within the UI to a name of an item discovered through said ontological framework, wherein the hyperlinks appearing within the UI are driven dynamically by the computer system's data content and are not predetermined.

2. The computer system of claim 1, wherein the threaded environment associates the function registries with the one or more threads.

3. The computer system of claim 1, wherein each of the function registries includes an ancestral scope.

4. The computer system of claim 3, wherein the function registries further include a global registry that has an ancestral scope that incorporates all other function registries.

5. The computer system of claim 1, wherein the function registries are capable of registering one or more functions by name.

6. The computer system of claim 5, wherein the function registries are capable of registering the one or more functions at a given ancestral scope and associating the one or more functions with the one or more threads.

7. The computer system of claim 6, wherein the API supports searches of the registered functions.

8. The computer system of claim 7, wherein the API supports the searches of the registered functions in an order determined by an ancestral scope of the registered functions.

9. The computer system of claim 8, wherein the API supports execution of the registered functions located responsive to the searches.

10. The computer system of claim 9, wherein the API associates the arbitrary data and logical flags with the registered functions by direct calls to the registered functions included in the API.

11. The computer system of claim 9, wherein the API associates the arbitrary data and logical flags with the registered functions in response to an event.

12. The computer system of claim 9, further comprising a reply system, wherein the reply system returns any results obtained from executing the registered functions to a calling context in a synchronous manner.

13. The computer system of claim 9, further comprising a reply system, wherein the reply system returns any results obtained from executing the registered functions to a calling context in an asynchronous manner.

14. The computer system of claim 9, wherein the API includes an ability to inhibit or enable execution of one or more of the registered functions by ancestral scope.

15. The computer system of claim 6, wherein the API associates the arbitrary data and logical flags with the registered functions.

16. The computer system of claim 1, wherein the threaded environment is capable of passing events containing messages between threads.

17. The computer system of claim 1, wherein the threaded environment is capable of retrieving threads based on a unique thread identifier.

18. The computer system of claim 1, wherein the atomic widgets may cause another atomic widget to be executed.

19. The computer system of claim 1, wherein one of the atomic widgets is nested into another atomic widget up to an arbitrary depth, wherein such depth does not exceed 32767.

20. The computer system of claim 1, further comprising a display handler for displaying the target when the hyperlink is selected, wherein the display handler is capable of calling one or more of the atomic widgets when the hyperlink is selected.

21. The computer system of claim 1, further comprising system-wide and user-specific hyperlink domains, wherein the system-wide and user-specific hyperlink domains are created using a lexical analyzer.

* * * * *